United States Patent [19]
Kerth et al.

[11] Patent Number: 5,739,048
[45] Date of Patent: Apr. 14, 1998

[54] METHOD FOR FORMING ROWS OF PARTIALLY SEPARATED THIN FILM ELEMENTS

[75] Inventors: Randall Thomas Kerth, San Jose; John Joseph Kotla, Morgan Hill, both of Calif.

[73] Assignee: International Business Machines Corporation, Armonk, N.Y.

[21] Appl. No.: 248,281

[22] Filed: May 23, 1994

[51] Int. Cl.$^6$ .................................................. H01L 21/302
[52] U.S. Cl. .............................................. 437/226; 437/227
[58] Field of Search .................................... 437/226, 227

[56] References Cited

U.S. PATENT DOCUMENTS

| | | | |
|---|---|---|---|
| 3,970,819 | 7/1976 | Gates et al. | 437/226 |
| 4,217,689 | 8/1980 | Fujii et al. | 437/227 |
| 4,226,018 | 10/1980 | Nakanishi et al. | 29/603 |
| 4,333,229 | 6/1982 | Ellenberger | 29/603 |
| 4,624,048 | 11/1986 | Hinkel et al. | 29/603 |
| 4,644,641 | 2/1987 | Verdone | 29/603 |
| 5,095,613 | 3/1992 | Hussinger et al. | 29/603 |
| 5,196,378 | 3/1993 | Bean et al. | 437/227 |
| 5,272,114 | 12/1993 | van Berkum et al. | 437/227 |
| 5,314,844 | 5/1994 | Imamura | 437/226 |
| 5,418,190 | 5/1995 | Cholewa et al. | 437/226 |

FOREIGN PATENT DOCUMENTS

| | | | |
|---|---|---|---|
| 0044048 | 1/1982 | European Pat. Off. | 437/227 |
| 6-1181177 | 8/1986 | Japan | H01L 33/00 |
| 3-222346 | 10/1991 | Japan | H01L 21/78 |
| 4-276645 | 10/1992 | Japan | H01L 21/78 |

*Primary Examiner*—Robert Kunemund
*Attorney, Agent, or Firm*—Monica D. Lee; Ingrid M. Foerster

[57] ABSTRACT

A method for minimizing the damage caused by handling individual thin film elements. The method disclosed teaches formation of rows of completed sliders defined by one of two methods: wafer processing or row processing to form partial cuts between device elements. The resulting partial cuts preserve the row structure after fabrication, e.g., for inspection and packing, but allow easy separation of the completed sliders just prior to assembly.

25 Claims, 11 Drawing Sheets

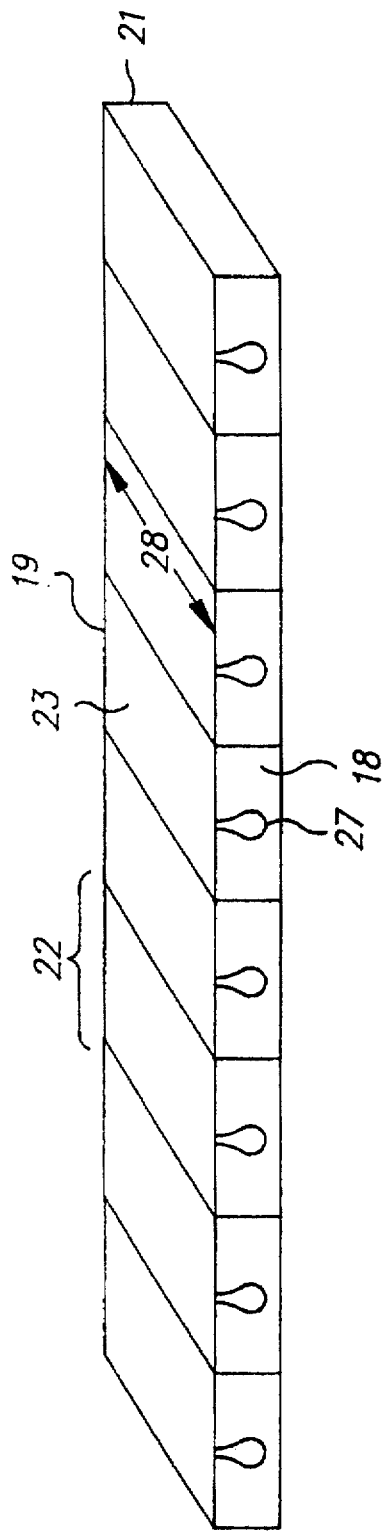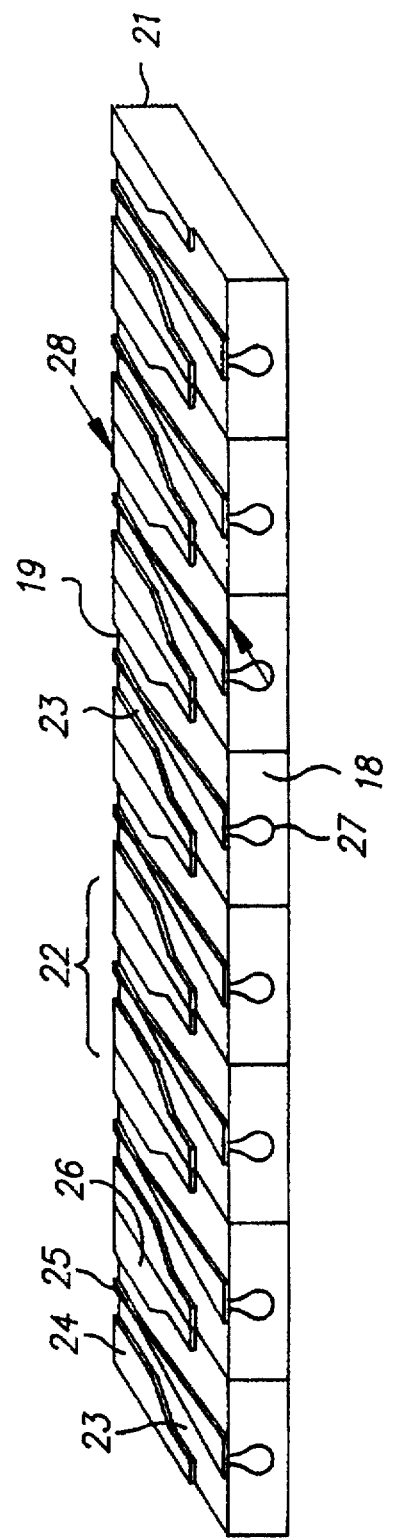

METHOD FOR FORMING ROWS OF PARTIALLY SEPARATED THIN FILM ELEMENTS

FIELD OF THE INVENTION

The present invention relates generally to the manufacture of thin film elements such as air bearing sliders. The invention more specifically relates to a method for partially processing a row of elements sliced from a wafer to minimize handling of the individual elements.

BACKGROUND OF THE INVENTION

Thin-film elements are typically fabricated from a wafer containing matrix arrays of electrical or electromagnetic devices applied to one of the wafer surfaces by known deposition methods. Such devices may, for example, be magnetic transducers or "heads" such as those used in a magnetic disk storage device. A wafer deposited with rows of magnetic heads must be further processed to form sliders. A slider is a structure for supporting one or more magnetic heads in close proximity to a rotating storage disk, and is generally mounted to a suspension extending from an actuator. A commonly used "air bearing" slider must have certain aerodynamic features to "fly" the head over the disk surface.

Air bearing sliders are typically formed by slicing one or more rows from the deposited wafer, e.g., by using a conventional grinding blade, and processing the resulting rows to shape the individual slider elements and their air bearing surfaces. Such processing may involve, e.g., known etching, milling, grinding and lapping methods. The individual sliders are then "diced" from the rows, inspected, packaged and transported to the assembly site for attachment to suspensions.

Considerable handling of the individual elements during inspection, packing, and unpacking is a concern because of the potential for damage to the delicate thin film devices. Further handling during assembly compounds the risk of damage and reduced yields. For example, thin film sliders are often damaged as they are manually maneuvered into position for suspension mounting. The concern becomes greater with smaller, more fragile designs such as the "pico-sliders".

What is needed is a process for fabricating thin film elements such as air bearing sliders that keeps a row intact during inspection, packing and unpacking, yet allows easy separation of individual elements at the assembly site. By keeping rows of elements intact, damage to individual elements is reduced and yield increases proportionally.

A number of row processing methods have been developed to improve yield during the fabrication of thin-film elements, but none address the issue of handling damage after fabrication, nor suggest keeping a row intact until assembly. For example, U.S. Pat. No. 5,095,613 describes a method for processing rows of sliders wherein single or double rows are anchored to a rigid reinforcing structure for lapping. The sliders are separated from the rows after processing to form individual elements. U.S. Pat. No. 4,226,018 similarly discusses processing of rows of sliders during fabrication and prior to row separation. U.S. Pat. No. 4,624,048 describes a fabrication process wherein a row of head elements is sliced from a wafer, and separating grooves are formed between the elements. The row is then fixed to a work surface having grooves corresponding to its separating grooves to facilitate later slider separation. The sliders are lapped and subsequently severed from one another while still attached to the work piece.

None of the references described, however, addresses the problem of handling damage incurred after fabrication is completed and prior to assembly. What is needed is a method for fabricating thin-film elements that facilitates easy separation of individual elements, yet preserves the row structure during inspection, packing, and other post fabrication handling to reduce handling damage.

SUMMARY OF THE INVENTION

Accordingly, a principal object of the present invention is to provide a convenient method for fabricating thin-film elements wherein completed elements form a row structure. Such fabrication avoids excessive handling of individual elements prior to assembly. It is a further object of the invention to facilitate easy separation of the elements from the row at the assembly site.

A process is therefore provided for forming partial cuts between the individual elements of a row sliced from a preprocessed wafer. A wafer comprising a wafer substrate such as $Al_2O_3$—TiC is deposited with a matrix of devices, such as magnetic heads. During wafer processing, partial cuts are formed between the device elements (e.g. sliders). In a preferred embodiment, the partial cuts are formed in the wafer prior to row slicing, either by forming channels on a single face of the wafer, or by forming dual channels on opposite faces of the wafer.

Alternatively, the partial cuts may be formed after a row has been sliced from the wafer. According to a first row processing method, channels are cut into the device (front) surface of a row between device elements, leaving the row intact at the back surface. In a second method, grooves are formed in an upper surface of the row adjacent to the device surface. In a third method, pairs of grooves are formed in the upper and lower surfaces of a row between device elements. Finally, channels which vary in depth from front to back surface are formed in the upper surface of the row according to a fourth row processing method.

Each of the methods disclosed results in rows of completed device elements separated by partial cuts. Thus the structure of the row is preserved for post fabrication handling, while facilitating easy element separation just prior to assembly.

The foregoing and other features and advantages of the present invention will be apparent from the preferred method and embodiment illustrated in the accompanying drawing.

BRIEF DESCRIPTION OF THE DRAWING

FIG. 2 is a perspective view of a row of sliders sliced from the wafer of FIG. 1(a);

DETAILED DESCRIPTION OF THE PREFERRED EMBODIMENT

The present invention will now be described in detail with reference to a preferred embodiment. Specific reference will be made to the fabrication of thin-film sliders. However, it shall be understood by those of ordinary skill in wafer fabrication that the present invention may also be applied to the fabrication of other small-scale devices. Moreover, the invention is not limited to presently known wafer fabrication techniques.

Figure 1B:
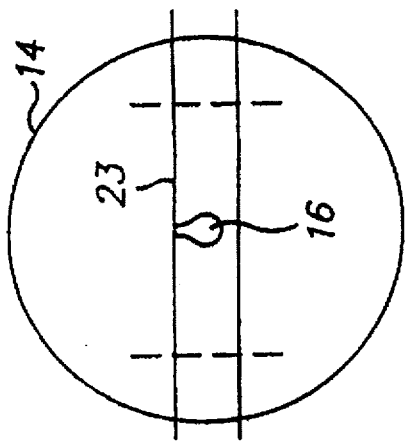
FIG. 1(b) is an enlarged view of one of the slider units of the wafer in FIG. 1(a), including a magnetic transducer element.
Figure 1A:
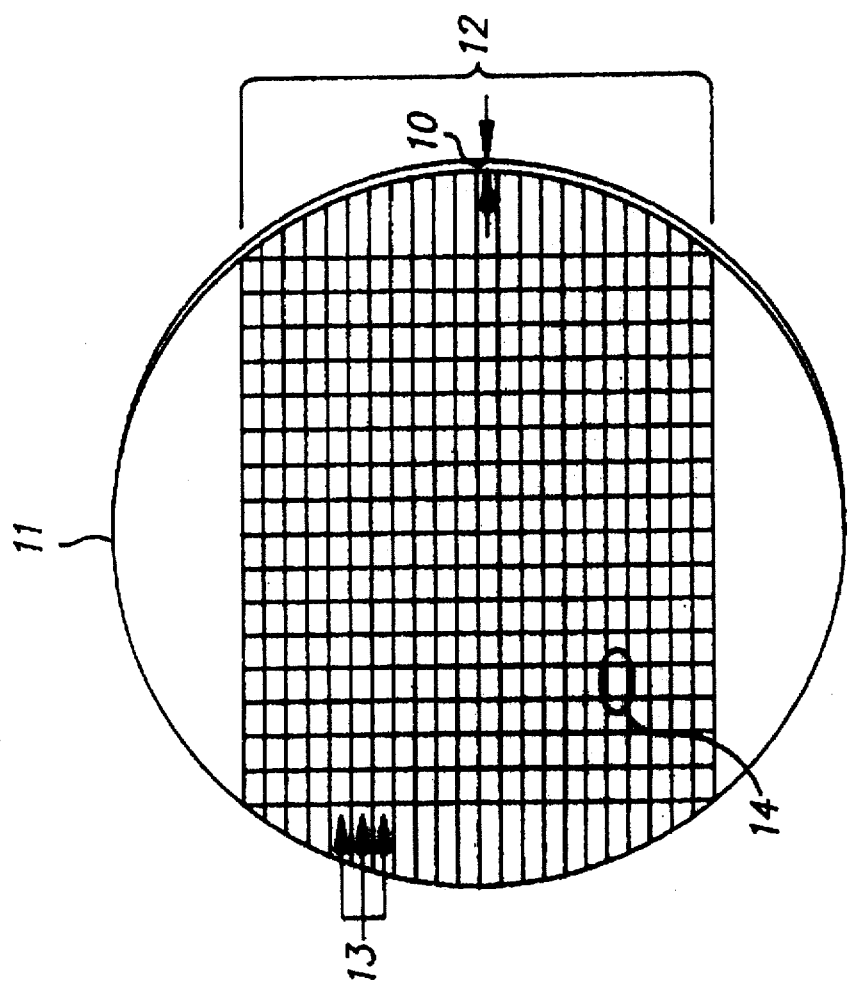
FIG. 1(a) is a perspective view of a typical preprocessed wafer on which a matrix of magnetic transducer elements has been deposited.

FIG. 1(a) shows a wafer 11 of predetermined thickness 10 typically comprising, e.g., a substrate of about 75% $Al_2O_3$ and 25% TiC. A matrix 12 of magnetic transducers has been formed on the wafer's surface by conventional methods such as chemical vapor deposition or sputtering. The wafer 11 is scribed by known grinding techniques to define multiple rows 13 of slider units 14. Each of these slider units 14 will become an independent thin-film slider at the completion of slider fabrication.

FIG. 1(b) is an enlarged view of one of the slider units 14 formed on the wafer 11 of FIG. 1(a). It includes a single, centrally oriented transducer element 16 according to a center-rail slider design. Single and double transducer side-rail designs may also be accommodated according to the methods of the present invention. The air bearing surface 23 of the slider is exposed during row slicing and is directly adjacent to the transducer 16.

FIG. 2(a) shows a row 21 of slider units sliced from the wafer according to known methods. The air bearing surface 23 of each slider unit is immediately adjacent to the transducer element 27, and extends from the trailing edge 18 to the leading edge 19 for a length 28. The length 28 of each slider 22 is determined by the width 10 of the wafer 11. According to conventional etching and milling techniques, rows of sliders are processed to shape the rails of the air bearing surfaces 23. For example, a tri-rail configuration is shown in FIG. 2(b). It includes three rails 23,24,25 defined on the ABS 23. A number of methods for shaping the air bearing surfaces 23 on a row 21 of sliders are presently known and are not relevant to the present invention. As such, they will not be discussed in further detail.

Ordinarily, a row of sliders is diced to form individual sliders once row processing is completed. According to the present invention, partial cuts are formed between the slider units to define, but not separate, the individual sliders. The row is therefore kept intact for subsequent inspection, packaging and shipping. Partial cuts may be formed before or after row slicing by the processes described below.

Figure 3A:
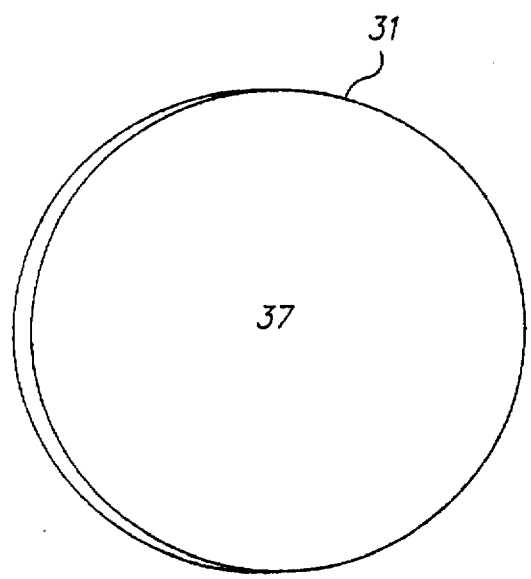
FIGS. 3(a)–(c), respectively, are perspective views of a preprocessed wafer after element deposition; the same wafer after a 3-side trim; and the same wafer after row scribing.
Figure 3B:
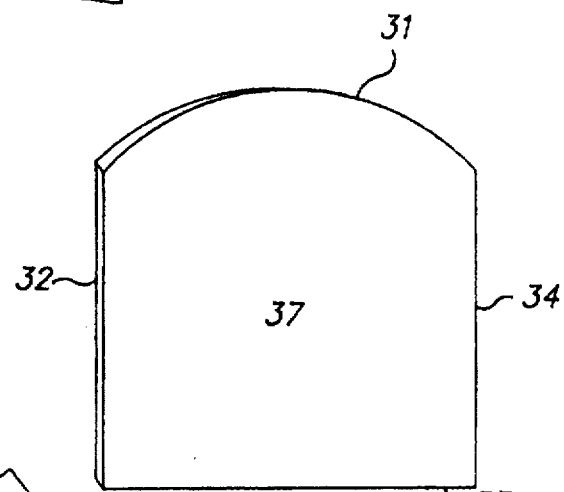
Figure 3C:
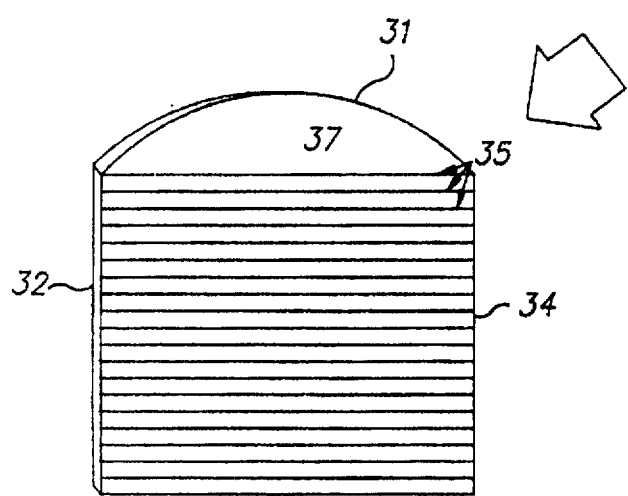

FIGS. 3(a)–(c) show a sequence of steps for preparing a preprocessed wafer 31 for row slicing. After element deposition, the wafer is mounted to some type of holding device. It is trimmed to form a pair of vertical edges 32,34 and a horizontal edge 33 as shown in FIG. 3(b). The wafer is then scribed, as shown in FIG. 3(c), to form a plurality of horizontal lines 35 between rows of transducer elements (not shown).

I. Partial Cutting by Wafer Processing

A. Dual Channels

Figure 4A:
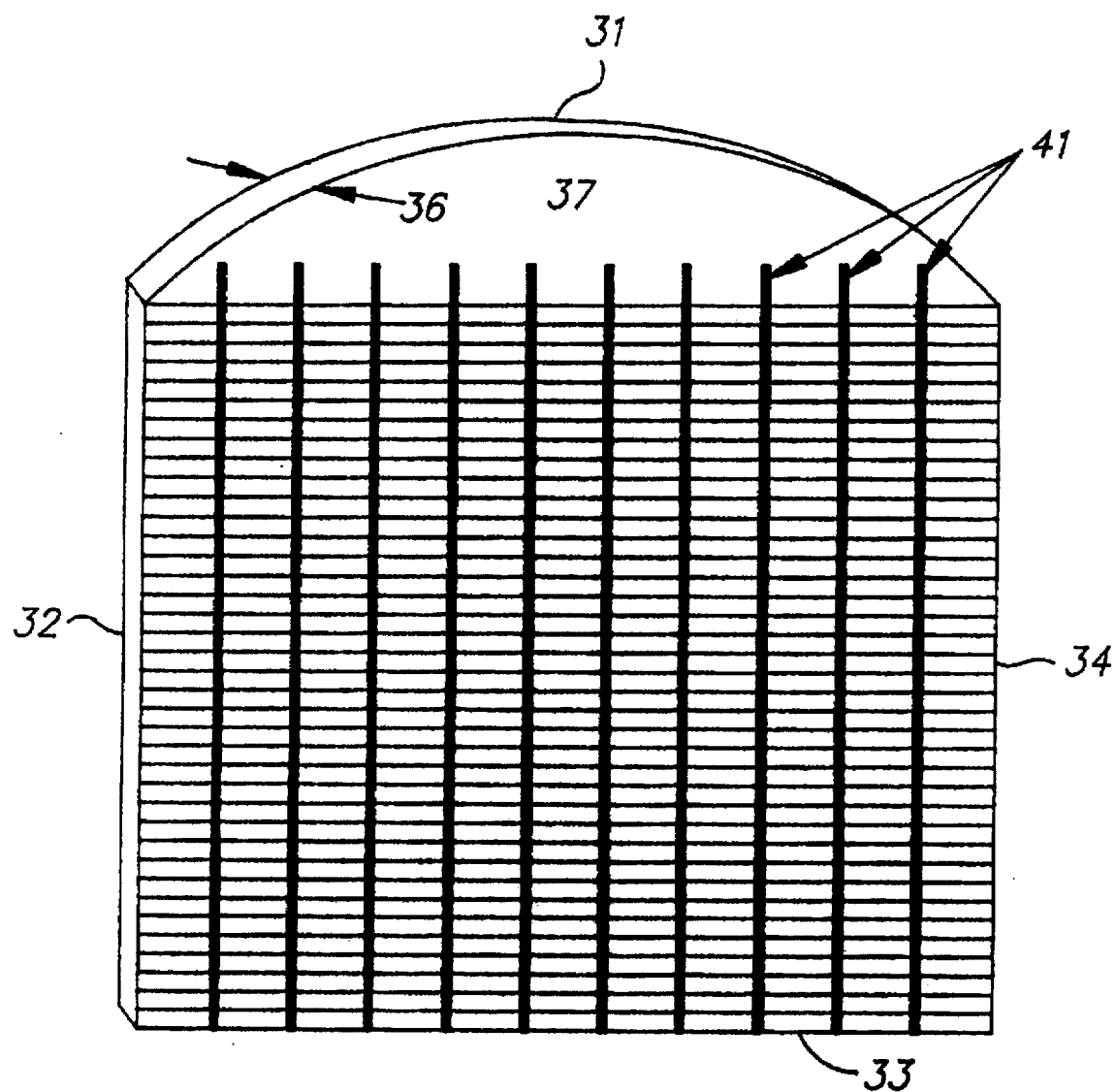
FIG. 4(a) is a perspective view of the wafer of FIG. 3(c) after channel cutting according to the wafer processing method of the present invention.

According to the preferred "dual channel" method of the present invention, a plurality of vertical channels 41 are now cut into the deposited surface of the prepared wafer, as shown in FIG. 4(a). Preferably, the channels 41 have a depth less than half that of the wafer thickness 36. Conventional grinding may be used in the fabrication of "nano-sliders" such as those used today in a typical 3½" Winchester disk drive, having dimensions on the order of e.g., 2.0 mm length×1.6 mm width×0.425 mm thickness. For sliders of smaller dimensions such as "pico-sliders" (e.g., 1.25 mm length×1.0 mm width×0.3 mm thickness), methods such as laser ablation, ion milling and ultrasonic machining are more suitable.

After the channels are formed, the wafer is removed from the holding device, flipped over, and remounted. Channels are then cut into the opposite wafer surface, again preferably to a depth less than half that of the wafer thickness 36. Each channel is aligned with a corresponding channel on the deposited side of the wafer. The total depth of each aligned channel pair is less than the total wafer thickness, thus leaving connecting portions of substrate between device columns.

Figure 4B:
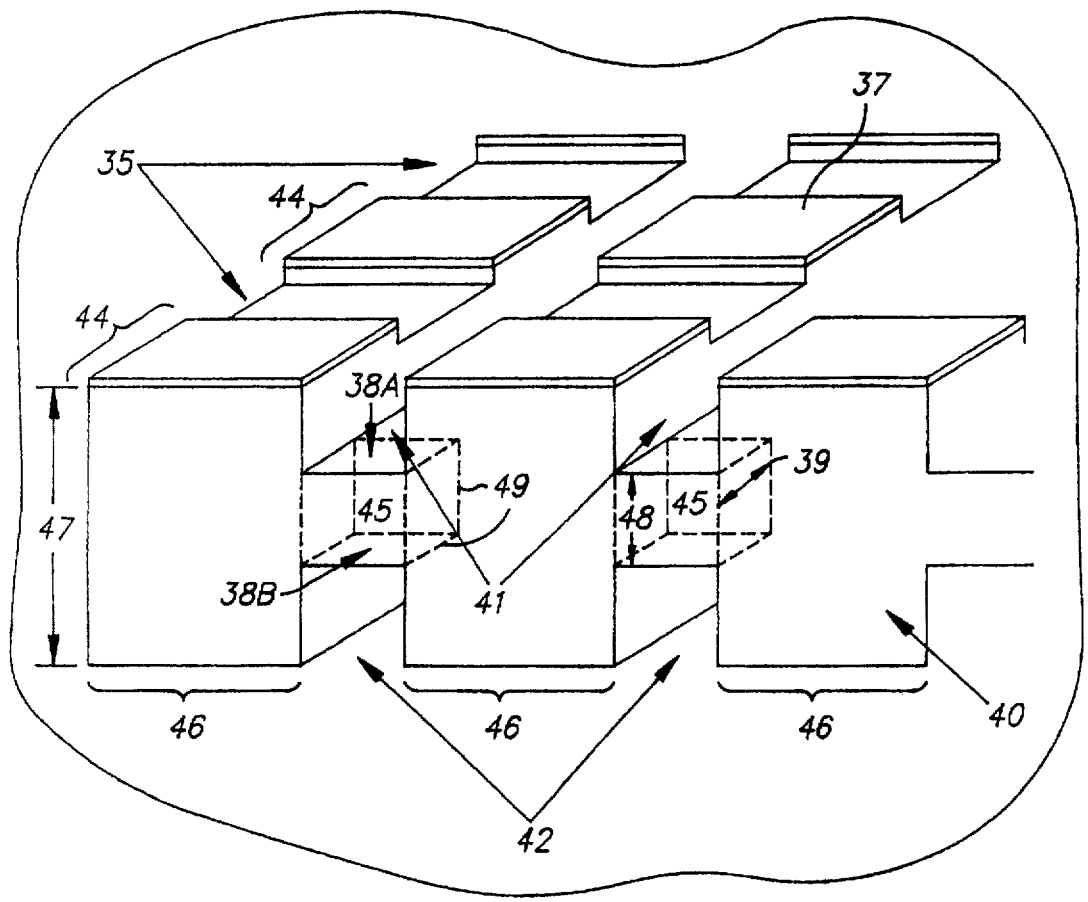
FIG. 4(b) is an enlarged perspective end-view of the wafer of FIG. 4(a)

The dual channels 41,42 resulting from the preceding steps are shown in FIG. 4(b). Portions of two rows 44 of slider units are shown, including the deposited surface 37 of the wafer, and the exposed air bearing surfaces 40 of the first row. The rows 44 are defined by scribe lines 35. Each slider unit within a row is further defined by the dual channels 41,42 formed according to the present invention. The slider units remain integral to the wafer by uncut connecting portions 45 of substrate remaining between the channels 41,42. The thickness of the connecting portions is carefully selected to provide sufficient resistance against breakage during slicing, row processing and handling. Yet it must also allow easy detachment of sliders from the row with the application of a small breaking force without subsequent damage to the sliders. For example, in the fabrication of a 50% slider, a thickness 48 of between 0.300 mm and 0.600 mm is preferred.

Prior to row separation, an area of each connecting portion 45 indicated by dotted lines 49 is cut away to recess the connector 45 from adjacent air bearing surfaces 40. The recess has a depth 39 carefully selected to assure no change in air bearing characteristics of the completed slider. For example, in 50% slider fabrication, the recess exceeds approximately 0.020 mm. Removal is achieved by grinding between each slider unit 46 in the direction of the arrows 38A or 38B. Alternatively, the removal may be performed on individual rows after row slicing (refer to the dotted lines 55 in FIG. 5(a)).

Figure 5A:
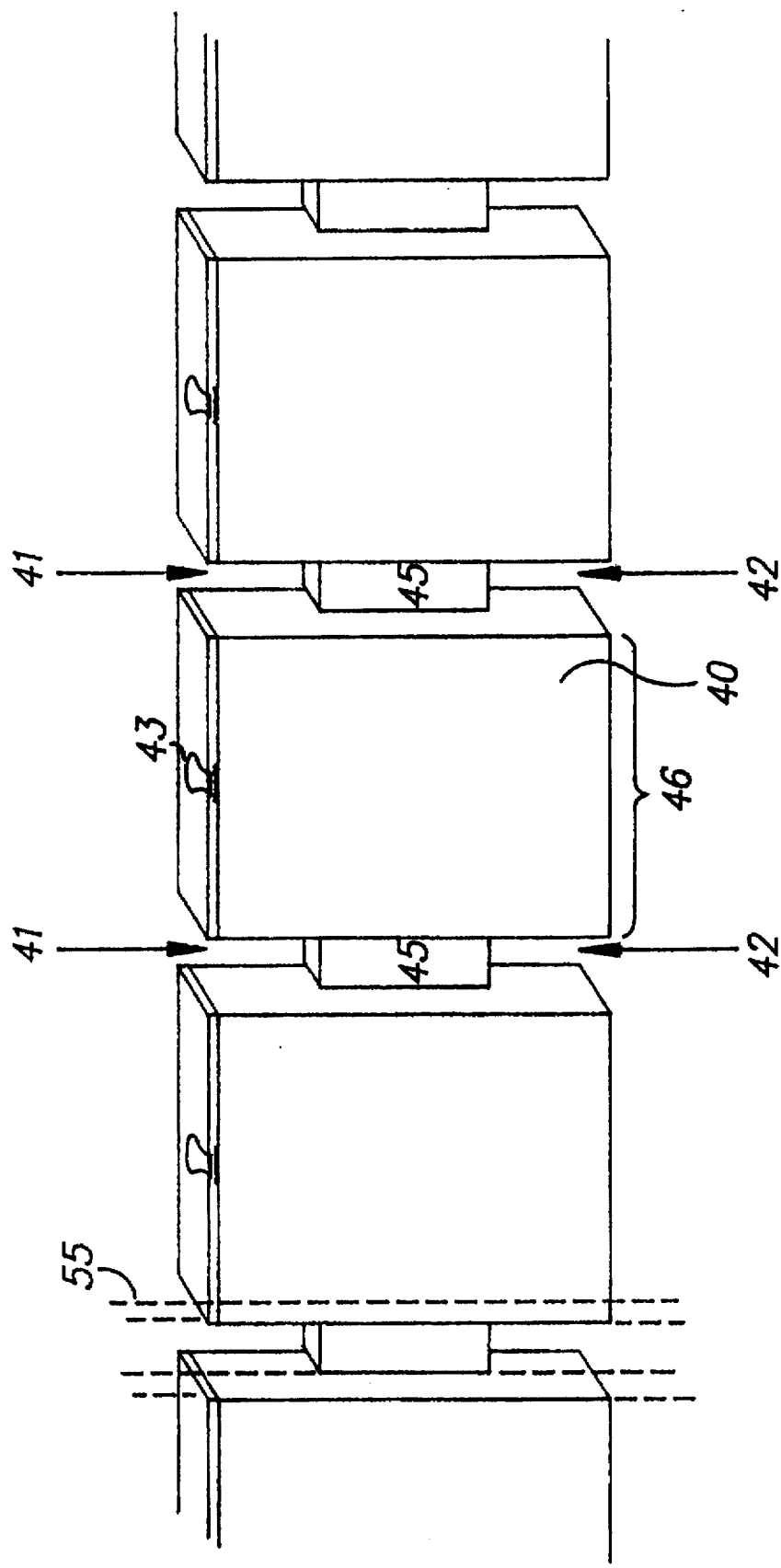
FIG. 5(a) is a perspective view of a row of sliders having partial cuts according to the wafer processing method of the present invention.
Figure 5B:
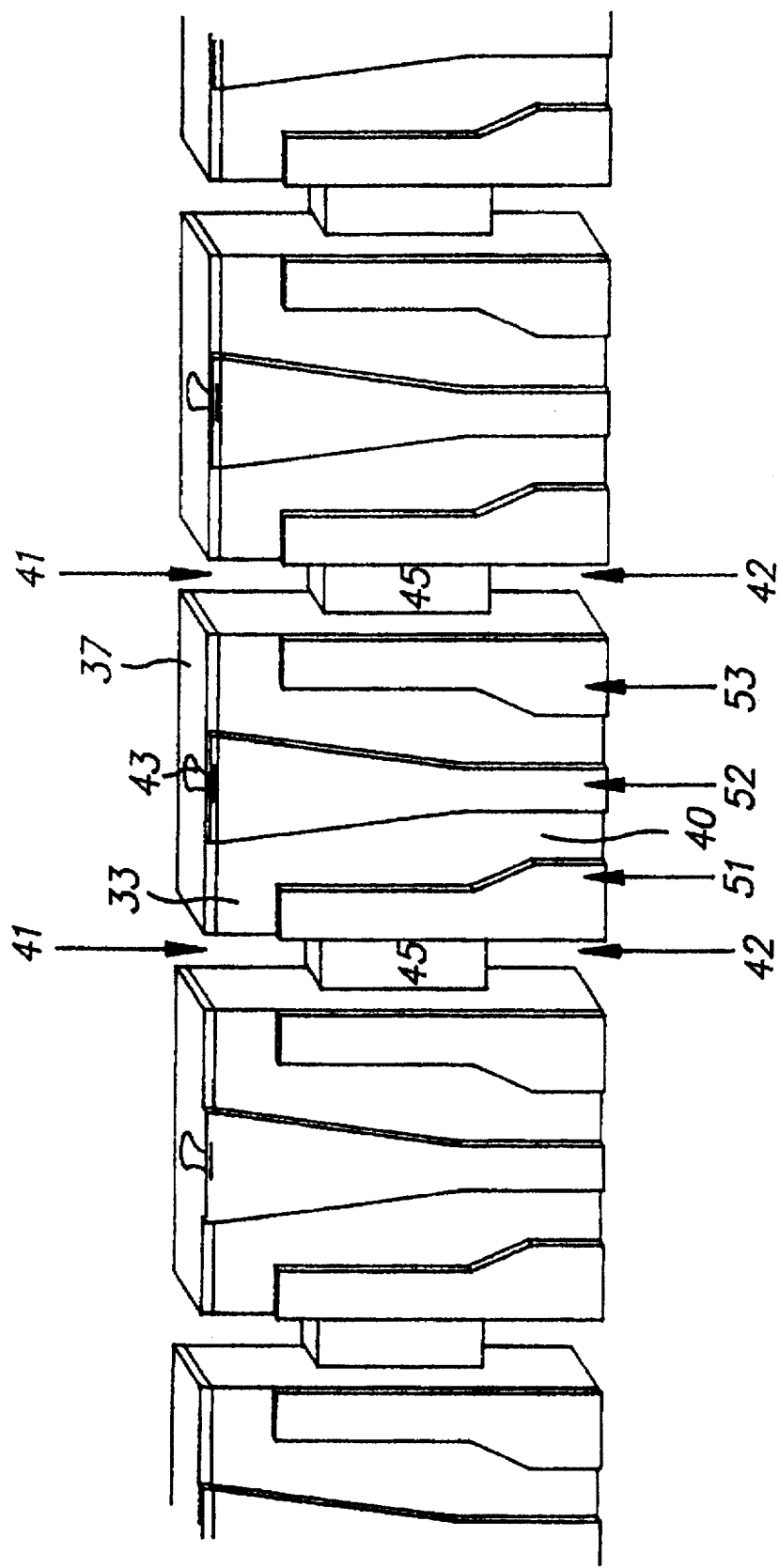
FIG. 5(b) is a perspective view of the row of sliders of FIG. 5(a) after rail shaping.

Referring back to FIG. 4(a), the rows of sliders are next sliced from edge 33 of the wafer 31. A segment of a row bar is shown in FIG. 5(a). Each slider unit 46 includes a deposited surface 37 on which a data head 43 resides, an air bearing surface 40, and connecting portions 45 recessed from the ABS 40. Individual row bars may be mounted to a work surface for subsequent row processing. For example, FIG. 5(b) shows the row bar of FIG. 5(a) after rail shaping. A tri-rail configuration 51,52,53 is shown. Once row processing is complete, the intact rows are ready for inspection, packing, and shipment to the assembly site.

Just prior to assembly, sliders are detached from row bars by applying a small breaking force to the connective portions 45 between the completed slider units, either manually, or with the aid of an appropriate dispenser.

B. Single Channel

Figure 6:
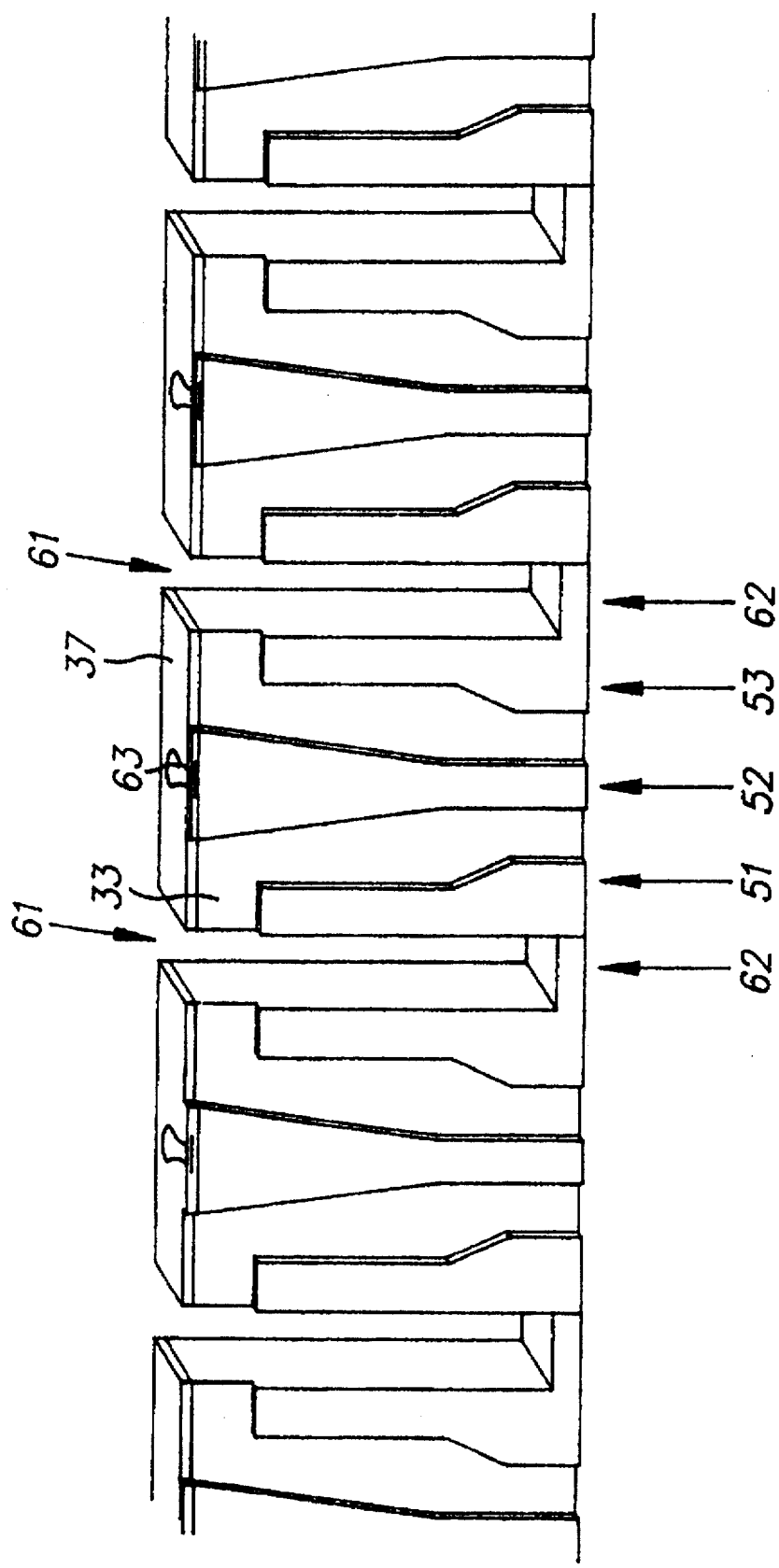
FIG. 6 is a perspective view of a row of sliders having partial cuts according to an alternative wafer processing method of the present invention.

In an alternative, "single-channel" method, a plurality of vertical channels are cut into the deposited side 37 of the prepared wafer 31 to a depth about 4/5 of the wafer thickness 36. (Refer to FIG. 4(a)). Rows are then sliced from the slider to form row bars such as those shown in FIG. 6. Rows prepared by this method include portions 62 along the base of the row bar connecting the slider units 46 as shown. The connectors 62 are purposely located away from the transducer elements 63 at the slider's "trailing edge" to minimize changes in air bearing characteristics. This method eliminates a number of steps of the dual channel approach. On the other hand, overall yield may be lower because row separation occurs at the thin connecting portions 62.

II. Partial Cuts by Row Processing

As an alternative to wafer processing, partial cuts can be formed by row processing. For example, in FIG. 7(a), a row is shown having a front surface 72 on which a plurality of transducer devices 71 have been deposited, a back surface 73, upper and lower surfaces 74,75, and two end surfaces 76,77. The row to be processed is placed on a work surface and held in place according to known methods such as vacuum suction.

Figure 7A:
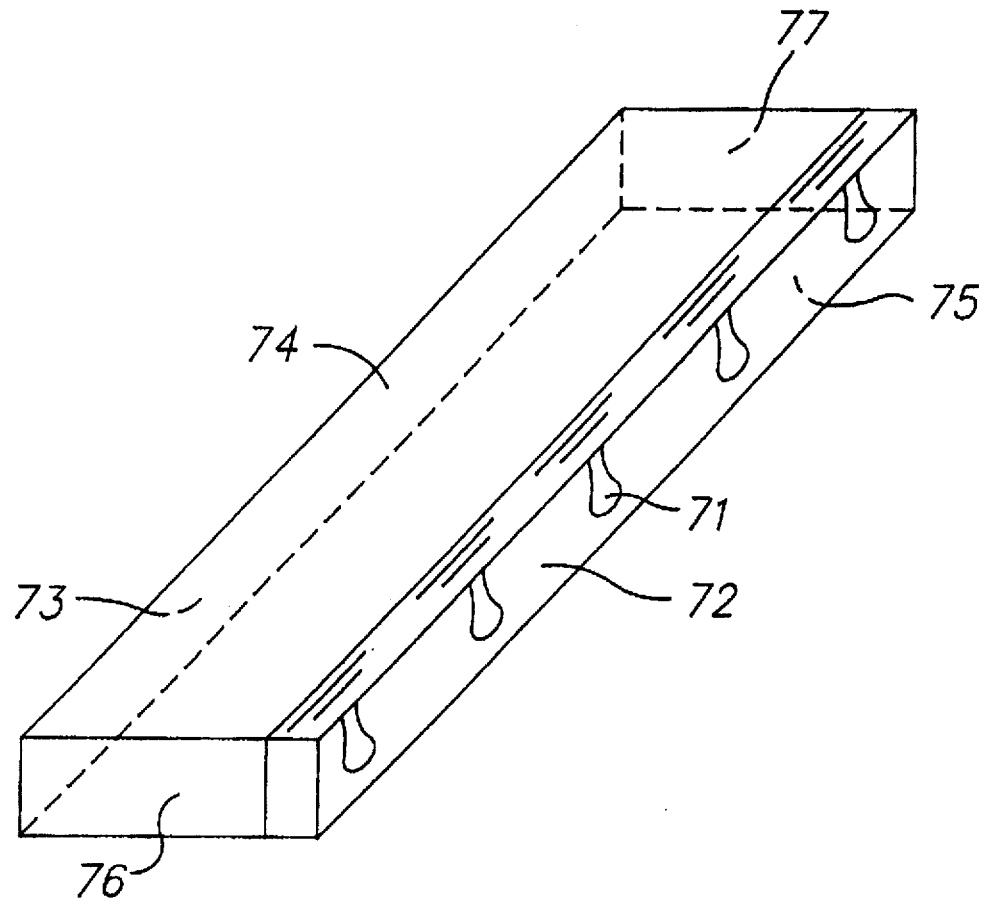
FIG. 7(a) is a perspective view of a row sliced from a wafer prior to partial cutting according to the row processing methods of the present invention.
Figure 7B:
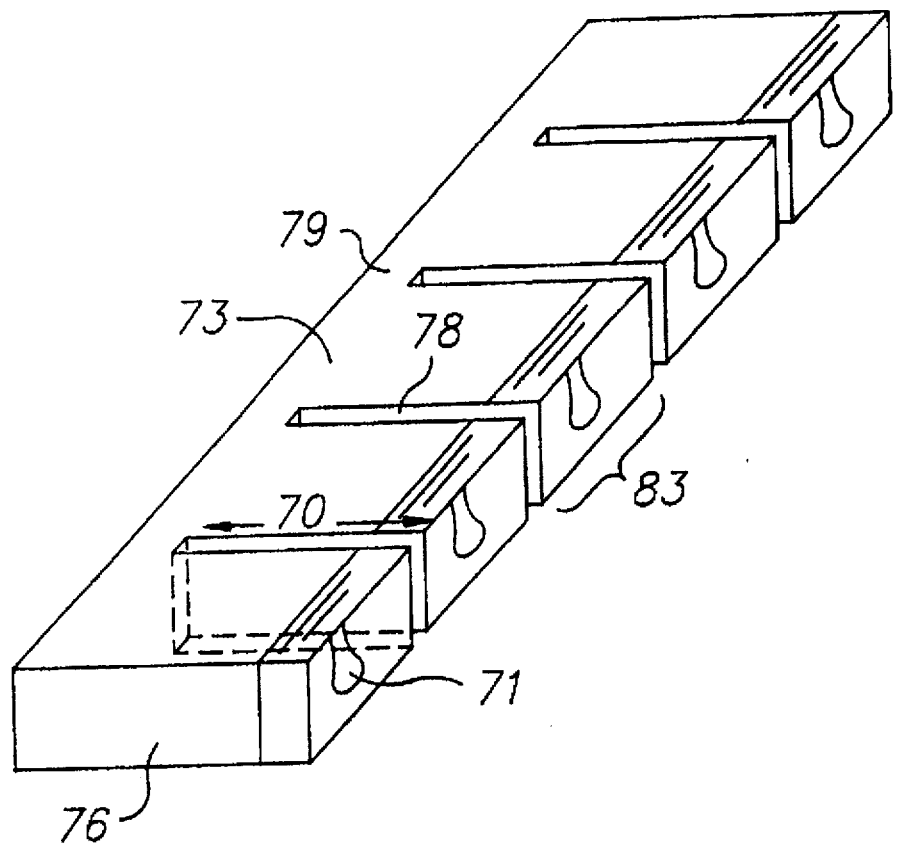
FIG. 7(b) is a perspective view of a row of sliders having partial cuts according to a preferred row processing method of the present invention.

FIG. 7(b) illustrates a row having partial cuts formed according to a first method of the present invention. A plurality of channels 78 are cut into the row, e.g., by running an industry standard grinding blade into the device side 72 of the row between slider units 83. The blade cuts from the device side 72 toward the back surface 73, but is halted before cutting completely through the substrate, thus defining but not severing the slider units 83. Five units 83 are shown for illustration purposes only. A relatively small portion of substrate 79 remains between the slider units 83 to connect them along back surface 73. The channel length 70 is carefully selected to provide sufficient strength for preservation of the row structure during subsequent handling, yet to provide easy slider detachment with a small amount of breaking force. The channels 78 may be parallel, as shown in FIG. 7(b). Alternatively, wedge-shaped or skewed cuts may be more appropriate for rows of non-rectangular thin-film elements. Moreover, the cuts may also be formed by methods such as laser ablation, ion milling, ultrasonic machining, and reactive ion etching. Note that the resulting row of FIG. 7(b) is essentially identical in structure to that of FIG. 6 obtained by wafer processing according to the present invention.

Figure 8:
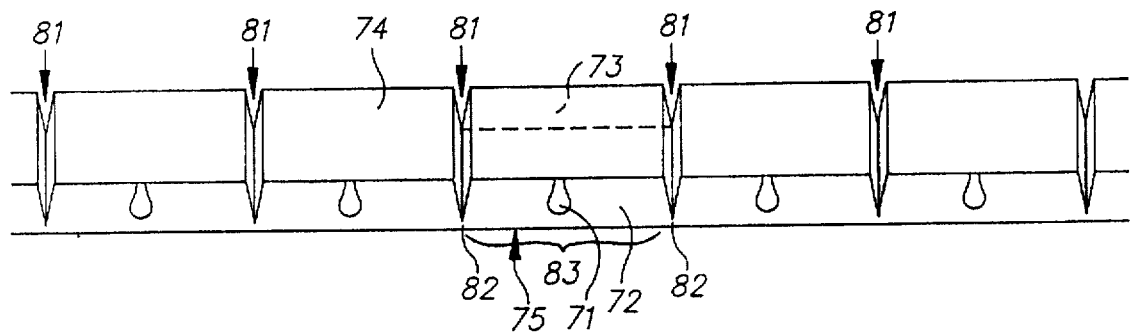
FIGS. 8, 9 and 10 are perspective views of a row of sliders having partial cuts according to additional row processing methods according to the present invention.

Referring now to FIG. 8, a second row processing method will be described. As in the preceding method, a row of slider units such as that of FIG. 7(a) is secured to a work surface. Next, a plurality of V-shaped grooves 81 are formed in the upper surface 74, e.g., using an industry standard tapered grinding blade. The grooves 81 extend horizontally from device surface 72 to back surface 73, and have a predetermined depth so that a portion of substrate 82 remains to connect the slider units along the lower surface 75. As in preceding methods, the depth of the groove is carefully selected to balance strength and ease of slider removal. The grooves 81 may be parallel, as shown, or skewed to accommodate other thin film element shapes.

Figure 9:
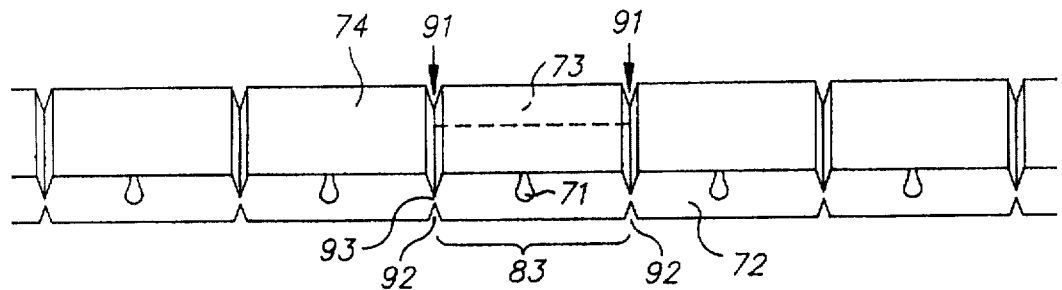

FIG. 9 shows a variation of the V-groove method. V-shaped grooves are formed in the row's upper surface 74, e.g., by tapered grinding blade, to define individual slider units 83. The entire row is then removed from the work surface, flipped, and remounted to expose the lower surface 75. A plurality of V-shaped grooves 92 are then formed in that surface, each groove 92 aligned with a corresponding groove 91 formed in the upper surface 74, as shown.

Figure 10:
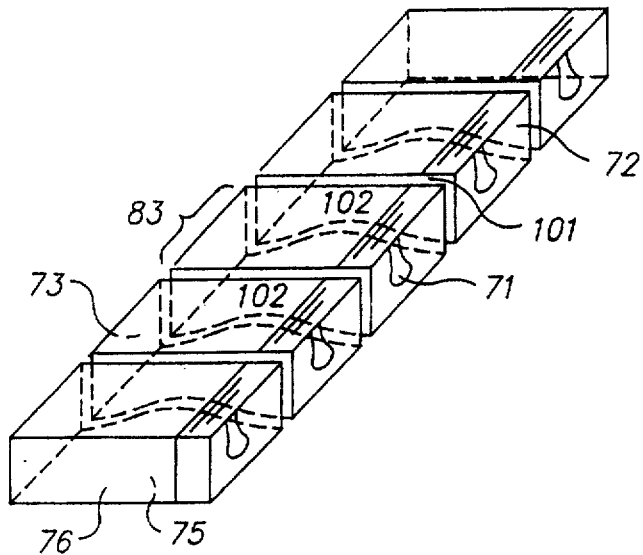

Another method for forming partial cuts is shown in FIG. 10. A plurality of channels 101 having a varied depth are formed in the row. For example, an industry standard grinding blade with adjustable cutting height begins cutting into the front surface 72 of the row between slider units 83. As the blade cuts from the device side 72 toward the back surface 73, the cutting depth is gradually decreased, then increased, to leave a connecting portion of substrate 102 between the units 83 along the lower surface 75. The connecting portion 102 is shown having a bell-curve shape, although other shapes are possible. Primary considerations affecting the shape will be manufacturability, the amount of connecting strength required, ease of slider detachment, and impact of the substrate portion 102 on air bearing characteristics after slider separation. The bell-curve shape involves a relatively simple cutting process and is intentionally recessed a sufficient distance from the ABS to virtually eliminate air bearing interference. The channels 101 need not be parallel as shown, but may be skewed to adapt to different element types. Alternatives to grinding such as the methods suggested previously may also be used to form the channels 101.

While the invention has been particularly described with reference to several methods in the fabrication of thin film sliders, it will be understood that other implementations of the general concept may be made without departing from the spirit and scope of the claimed invention.

We claim:

1. A method of processing a row of thin film elements, comprising the steps of:

in a row of thin-film elements separated from a wafer, forming partial cuts between the elements to provide an intact, transportable row structure wherein the elements are separable from the row by application of a small breaking force at the partial cuts, the intact structure providing greater protection to the elements from post-fabrication handling damage than is provided by individually diced elements.

2. The method of claim 1, wherein the row includes a front surface, a back surface, upper and lower surfaces extending the length of the row, and wherein the partial cuts comprise a plurality of grooves formed along the upper surface extending from the front surface to the back surface, the elements remaining connected along the lower surface.

3. The method of claim 2, wherein the partial cuts further comprise a plurality of grooves formed along the lower surface, each groove substantially aligned with a groove of the upper surface and extending from the front to the back surface, the elements remaining connected between pairs of the substantially aligned grooves.

4. The method of claim 1, wherein the row includes a front surface, a back surface, upper and lower surfaces extending the length of the row, and wherein the partial cuts are formed by cutting a first plurality of notches through the row extending from the front surface toward the back surface.

5. The method of claim 4, further comprising the steps of:
cutting a second plurality of notches through the row extending from the back surface toward a corresponding one of the notches extending from the front surface, the elements remaining connected between respective pairs of the front and back notches.

6. The method of claim 1, wherein the row includes a front surface, a back surface, upper and lower surfaces extending the length of the row, and wherein forming the partial cuts further comprises the steps of forming a plurality of cuts of varying depth in the upper surface, the cuts extending from the front surface to the back surface, the elements remaining connected along the lower surface.

7. The method of claim 6, wherein the depth of each cut gradually decreases, then gradually increases from the front surface toward the back surface.

8. The method of claim 1, wherein the partial cuts are formed by grinding, ion milling, ultrasonic machining, laser ablation, a tapered grinding blade, or reactive ion etching.

9. The method of claim 1, wherein the elements further comprise sliders.

10. The method of claim 1, wherein the thin-film elements further comprise transducers.

11. The method of claim 10, wherein the transducer comprises a magnetic recording head.

12. A method for forming partial cuts in a row of thin film elements, comprising the steps of:

on a wafer having first and second planar surfaces, the first planar surface including a plurality of thin film elements formed thereon in a matrix of rows and columns, forming a partial cut between each column of thin film elements; and slicing the rows of thin film elements from the wafer to produce a plurality of intact, transportable row structures, wherein the thin film elements are separable from the row by application of a small breaking force at the partial cuts, and wherein the structure provides greater protection to the thin film elements from post-fabrication handling damage than is provided by individually diced elements.

13. The method of claim 12, further comprising the step of, prior to row slicing, forming a partial cut between each column of thin film elements on the second planar surface.

14. The method of claim 12, wherein the partial cuts are formed by grinding, ion milling, ultrasonic machining, laser ablation, a tapered grinding blade, or reactive ion etching.

15. The method of claim 12, wherein the thin film elements further comprise sliders.

16. The method of claim 12, wherein each thin-film element further comprises a transducer.

17. The method of claim 16, wherein the transducer comprises a magnetic recording head.

18. A method for forming partial cuts in a row of thin film elements, comprising the steps of:

from a wafer including first and second planar surfaces and a plurality of thin film elements formed on the first planar surface in a matrix of rows and columns, slicing a row of thin film elements; and forming partial cuts in at least one row of thin film element to produce an intact, transportable row structure, wherein the thin film elements are separable from the row by application of a small breaking force at the partial cuts, and wherein the row structure provides greater protection to the thin film elements from post-fabrication handling damage than is provided by individually diced elements.

19. The method of claim 18, wherein the row includes a front surface having a plurality of thin film elements formed thereon, a back surface, upper and lower surfaces extending the length of the row, and first and second end surfaces, and wherein the partial cuts are formed by forming a groove along the upper surface between each of the thin film elements, each groove extending from the front surface to the back surface, the thin film elements remaining connected along the lower surface.

20. The method of claim 19, further comprising the step of forming a groove along the lower surface between each of the thin film elements, each extending from the front surface to the back surface, the thin film elements remaining connected between the upper and lower grooves.

21. The method of claim 18, wherein the partial cuts are formed by grinding, ion milling, ultrasonic machining, laser ablation, a tapered grinding blade, or reactive ion etching.

22. The method of claim 18, wherein each row includes a front surface having a plurality of thin film elements formed thereon, a back surface, upper and lower surfaces extending the length of the row, and first and second end surfaces, and wherein the partial cuts are formed by cutting a notches between each of the thin film elements of the row from the front surface toward the back surface, the thin film elements remaining connected along the back surface.

23. The method of claim 18, wherein each row includes a front surface having a plurality of thin film elements formed thereon, a back surface, upper and lower surfaces extending the length of the row, and first and second end surfaces, and wherein the partial cuts are formed by:

cutting a first plurality of notches through the row extending from the front surface toward the back surface;

cutting a second plurality of notches through the row extending from the back surface toward a corresponding one of the notches extending from the front surface, the thin film elements remaining connected between respective pairs of the front and back notches.

24. The method of claim 18, wherein each row includes a front surface having a plurality of thin film elements formed thereon, a back surface, upper and lower surfaces extending the length of the row, and first and second end surfaces, and wherein the partial cuts are formed by forming a cut in the upper surface between each of the thin film elements, the cut extending from the front surface to the back surface and varying in depth from the front to back surfaces, the thin film elements remaining connected along the lower surface.

25. The method of claim 24, wherein the depth of each cut gradually decreases, then gradually increases from the front surface toward the back surface.

* * * * *